Feb. 20, 1923.

E. W. LIVELY.
EGG BEATER ATTACHMENT OR THE LIKE.
FILED MAR. 4, 1922.

1,445,696.

Inventor
Elbert W. Lively
By Henry E. Rockwell
Attorney

Patented Feb. 20, 1923.

1,445,696

UNITED STATES PATENT OFFICE.

ELBERT W. LIVELY, OF WEST HAVEN, CONNECTICUT.

EGG-BEATER ATTACHMENT OR THE LIKE.

Application filed March 4, 1922. Serial No. 541,185.

*To all whom it may concern:*

Be it known that I, ELBERT W. LIVELY, a citizen of the United States, residing in West Haven, county of New Haven, and State of Connecticut, have invented certain new and useful Improvements in Egg-Beater Attachments or the like, of which the following is a full, clear, and exact description.

This invention relates to attachments for agitators and, more particularly perhaps, to an attachment for egg beaters of the so-called Dover type which are usually provided with rotating or whirling beaters adapted to be operated by means of a crank wheel rotatably mounted upon a support or frame. It is well known that it is extremely difficult, especially when the beater is being used in thick liquids, to hold it in the proper position when in operation. The resistance encountered by beaters in their movement through the liquid, due to the viscosity of the latter and the resultant force which must be applied to the crank wheel and which is usually applied more or less inconveniently by the hand of the operator, tends to cause the beater to move or "walk" around in the vessel in which it is being operated, and it requires the expenditure of considerable force to exert sufficient pressure upon the frame of the beater to retain it in the proper position.

One object of my invention is to overcome the disadvantage above referred to and to provide an agitator or beater with means to retain it in a given position when in use.

Another object of my invention is to provide a device of this character with means which may be applied to a plane or flat surface and which will adhere thereto to hold the utensil in position.

A still further object of my invention is to provide an attachment for utensils of this character which may be readily attached to the ordinary form of egg beater now in use and which will be an efficient means to secure the beater against movement when in operation.

To these and other ends, the invention consists in the novel features and combination of parts to be hereinafter described and claimed.

Figure 1:
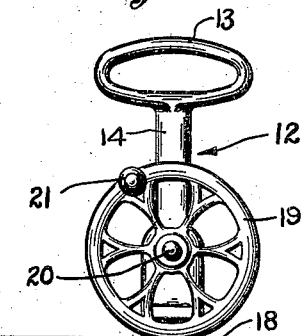
Fig. 1 is a side elevational view of an egg beater or agitator provided with my improvements.
Figure 2:
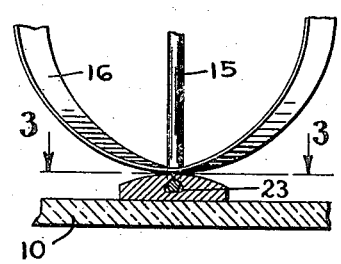
Fig. 2 is a fragmentary sectional view on line 2—2 of Fig. 1.
Figure 3:
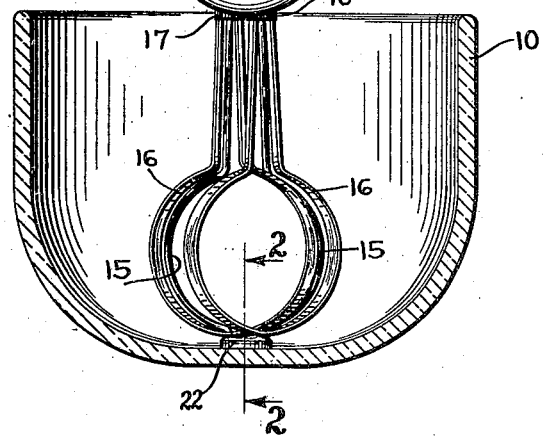
Fig. 3 is a sectional view on line 3—3 of Fig. 2.
Figure 4:
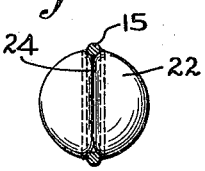
Fig. 4 is a detail view of the suction cup applied to the lower portion of the agitator.

While I have chosen to show and describe a preferred embodiment of my invention as applied to an egg beater of the so-called Dover type, it will be apparent that it will be applicable to other forms of agitators as well, and the particular embodiment shown is merely for the purpose of illustrating the novel principles involved.

In the drawings a vessel is designated at the numeral 10 upon the bottom of which rests an egg beater 12 provided with the usual hand grip 13 at the upper end of the standard 14. At the lower end of the standard is secured a frame 15 in the form of a looped wire or rod, the upper ends of which may be attached to the standard 14 in any desired manner. Rotatably mounted at the lower portion of the frame 15 are a pair of whirling agitators or beaters 16 which are connected at their upper ends to pinions 17 and 18, the teeth of which are in mesh in the usual manner with the teeth (not shown) upon a crank wheel 19 rotatably mounted at 20 upon the standard 14 and provided with the crank 21.

Figure 6:
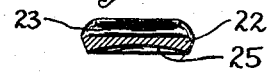
Fig. 6 shows the means of attaching the cup to the egg beater.

In order that the egg beater may be easily held in position while in operation, I have provided means at the lower portion thereof to grip or adhere to the surface of the vessel in which the utensil is used. In the embodiment shown, this means is in the form of a vacuum cup 22 which may preferably be formed of rubber or like material and which may be detachably connected to the beater. This connection is effected in the preferred form by providing an opening 23 through an intermediate portion of the vacuum cup in which is adapted to be received the lower part of the frame 14, which part may be inserted into the opening through a slit 24 in the upper portion of the vacuum cup. The transverse opening 23 through the upper wall of the cup is thus provided with gripping lips or jaws which extend substantially entirely across the cup and provide a comparatively large gripping surface by which the cup is securely held to the frame of the beater. The cup may be readily attached by grasping the edges thereof between the thumb and forefinger and the pressure which may be applied thereon will serve to open the jaws, as shown in Fig. 6, whereby the frame may be inserted in the opening 23. To release the cup from a vessel the beater may be tipped first to one side and then to the other and the cup will thus be moved to permit the entry of air thereunder, whereupon it may be readily lifted. It will be apparent that other means to connect the cup to the beater may be used, if desired.

Figure 5:
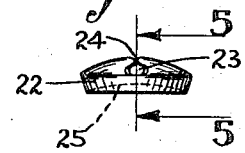
Fig. 5 is a sectional view on line 5—5 of Fig. 4.

At the lower portion, the member 22 is cupped out, as clearly shown at 25 in Fig. 5, so that it will effectively adhere to the surface of the vessel upon which it is placed, due to the excess of air pressure upon the upper side of the cup.

It will be apparent that if this cup is made of rubber or other material with a rather high co-efficient of friction, it will be retained in position by the friction between its surface and the surface of the vessel in addition to the force of suction due to the excess of air pressure upon the upper side thereof. It may be, therefore, that in some cases it will not be necessary to provide the member 22 of cup form, but that it will be found to operate efficiently if dependence is placed upon the friction of the material alone. I have preferred, however, to show a preferred embodiment of my invention as exemplified in the cup shaped member, which will adhere to the surface of the vessel by suction as well.

It will be apparent that the egg beater or agitator will be securely retained in the proper position when pressed into engagement with the surface of the vessel in which it is used, and that no trouble will be experienced by the operator due to a tendency of the utensil to walk about or to be displaced due to the force necessary to operate the crank.

While I have shown and described a preferred embodiment of my invention, it will be obvious that it is not limited to the precise details shown, but is capable of modification and variations which lie within the spirit of the invention and within the scope of the appended claims.

What I claim is:

1. An egg beater having a frame and a vacuum cup, for attachment thereto, having a transverse opening in the upper part thereof and a slit through its upper surface into said opening whereby the edges of the slit may be forced apart by pressure upon the edges of the cup to receive the frame therebetween.

2. An egg beater having a frame and a vacuum cup for attachment thereto having a relatively thick upper wall, said wall being recessed from the upper surface, thereof to provide a lipped opening extending substantially across the upper surface of the cup into which the frame may be inserted.

3. In combination, an egg beater and an attachment therefor, the attachment comprising a disk-shaped body of resilient material, said body having a transverse opening therethrough, a slit communicating with said opening through the upper surface of the body whereby gripping lips or jaws are provided extending substantially across the body, for the purpose described.

4. In combination, an egg beater having a frame and an attachment therefor the attachment comprising a substantially disk-shaped body having a cup shaped recess in its lower surface and an elongated slot opening through its upper surface and extending diametrically across the disk into which the frame may be inserted.

5. In combination, an egg beater having a frame and means to detachably retain said beater in operative position comprising a vacuum cup having a relatively thick upper wall formed with gripping jaws extending substantially across the cup to embrace a portion of the frame and detachably secure the cup thereto.

In witness whereof, I have hereunto set my hand on the 3rd day of March, 1922.

ELBERT W. LIVELY.